(12) United States Patent
Drigani et al.

(10) Patent No.: US 6,272,959 B1
(45) Date of Patent: Aug. 14, 2001

(54) CONTINUOUSLY ROTATING SHEARS

(75) Inventors: Fausto Drigani, Pozzuolo Del Friuli; Giampietro Pittari, Crocetta Del Montello, both of (IT)

(73) Assignee: Danieli & C. Officine Meccaniche Spa, Buttrio (IT)

( * ) Notice: Subject to any disclaimer, the term of this patent is extended or adjusted under 35 U.S.C. 154(b) by 0 days.

(21) Appl. No.: 09/408,105

(22) Filed: Sep. 29, 1999

(30) Foreign Application Priority Data

Sep. 29, 1998 (IT) .............................................. UD98A0163

(51) Int. Cl.[7] .................................................. B23D 25/12
(52) U.S. Cl. ......................... 83/299; 83/508.2; 83/698.51
(58) Field of Search ............................. 83/299, 304, 311, 83/343, 345, 698.51, 699.51, 497, 508.2, 298, 286, 665

(56) References Cited

U.S. PATENT DOCUMENTS

| | | | |
|---|---|---|---|
| 1,948,139 | | 8/1934 | Smitmans . |
| 2,125,939 | * | 8/1938 | MacFarren .............................. 83/341 |
| 2,177,465 | * | 10/1939 | Sieg ........................................ 83/299 |
| 2,201,581 | * | 5/1940 | Hallden .................................. 83/298 |
| 2,598,820 | * | 6/1952 | Neese ..................................... 83/302 |
| 2,850,092 | * | 9/1958 | Teplitz ................................... 83/299 |
| 3,003,380 | * | 10/1961 | Moser et al. ............................ 83/299 |
| 3,067,643 | * | 12/1962 | Ward, Jr. ................................. 83/332 |
| 3,140,900 | * | 7/1964 | Martin ................................. 384/447 |
| 3,218,900 | * | 11/1965 | Jones ....................................... 83/299 |
| 3,606,813 | * | 9/1971 | Hallden .................................. 83/672 |
| 3,724,307 | * | 4/1973 | Johnson ................................. 83/337 |
| 3,742,798 | * | 7/1973 | Gries ...................................... 83/298 |
| 3,899,945 | * | 8/1975 | Garrett et al. ............................ 83/38 |
| 3,906,827 | * | 9/1975 | Fritz ....................................... 83/299 |
| 3,956,957 | * | 5/1976 | Corse ..................................... 83/482 |
| 4,202,229 | * | 5/1980 | Feldkamper ........................... 83/304 |
| 4,226,149 | * | 10/1980 | Feldkamper et al. .................. 83/305 |
| 4,420,999 | * | 12/1983 | Hirakawa et al. ..................... 83/345 |
| 4,459,887 | * | 7/1984 | Ingham .................................. 83/311 |
| 4,548,112 | * | 10/1985 | Thomas ................................. 83/345 |
| 4,922,788 | * | 5/1990 | Nagai ..................................... 83/501 |
| 5,048,387 | * | 9/1991 | Niitsuma et al. ...................... 83/344 |
| 5,301,583 | * | 4/1994 | Kakko-Chiloff ....................... 83/344 |
| 5,311,800 | * | 5/1994 | Focke et al. ........................... 83/168 |
| 5,454,286 | * | 10/1995 | Takahan ................................ 83/346 |
| 5,662,018 | * | 9/1997 | Klein ..................................... 83/343 |
| 5,937,712 | * | 8/1999 | Maris ..................................... 74/665 |
| 6,032,560 | * | 3/2000 | Puchovsky ............................ 83/304 |

FOREIGN PATENT DOCUMENTS 3127573  3/1983 (DE) .
8703368  4/1987 (DE) .

* cited by examiner

*Primary Examiner*—Rinaldi I. Rada
*Assistant Examiner*—Kim Ngoc Tran
(74) *Attorney, Agent, or Firm*—Antonelli, Terry, Stout & Kraus, LLP

(57) ABSTRACT

Continuously rotating shears (10) to shear to size metallic strip fed continuously at up to around 20 meters per second and having a thickness of from 0.5 mm to 5 mm and a width of from 500 mm up to at least 1500 mm, comprising two blade-bearing drums (11, 111), the drums (11, 111) being supported at the ends by rotary cams (13, 113) governed by shearing command means (15, 16), the drums (11, 111) being positioned between the sides (18) of the frame (17) and being made to rotate by an external source of motion, each drum (11, 111) including an external gear (20, 120) cooperating with an inner toothing (26, 126) of a rotary tube (21, 121) which has an outer toothed wheel (25, 125), the two rotary tubes (21) being connected by the respective outer toothed wheels (25, 125) engaging together.

11 Claims, 1 Drawing Sheet

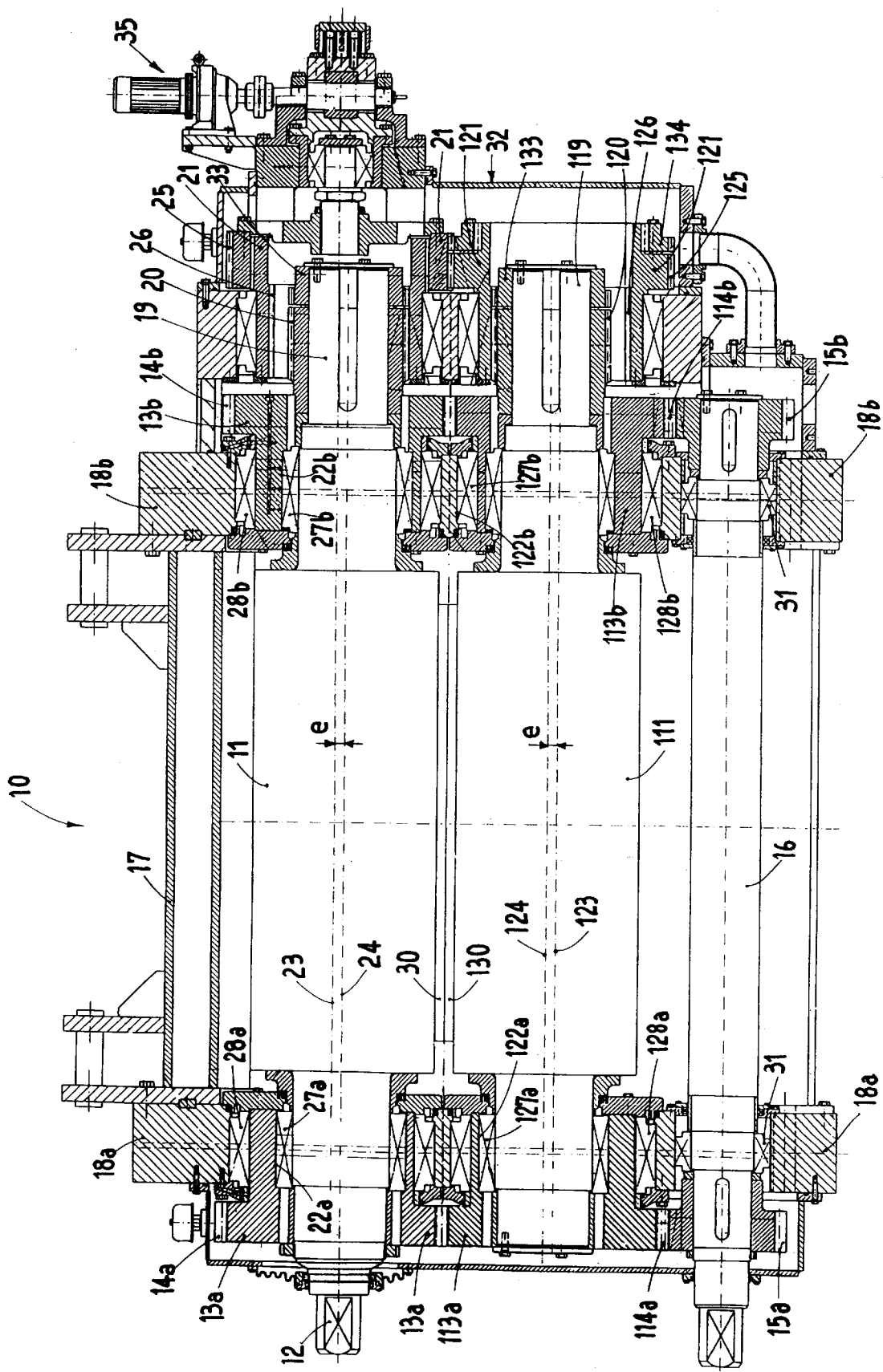

CONTINUOUSLY ROTATING SHEARS

FIELD OF THE INVENTION

This invention concerns a continuously rotating shears.

To be more exact, the invention concerns a continuously rotating shears to shear to the desired length on each occasion metallic strip with a thickness of from 0.5 mm to about 5 mm and a width of from 500 mm to more than 1500 mm.

The shears to which the invention refers is suitable to shear strip fed continuously at a speed of advantageously up to around 20 metres per second.

BACKGROUND OF THE INVENTION

The state of the art includes continuously rotating shears of the type as in this invention. The blades of the shears are always in rotation and they are brought to the shearing position at the desired moment by bringing nearer the respective axes of rotation with a parallel displacement.

It is quite clear that in this type of shears there are problems of synchronisation both between the blades and also between the blades and the shearing moment; there are also problems concerning the transmission of power.

If these problems are not properly solved they entail anomalous wear, vibrations, interferences, breakages, incorrect or incomplete shearing, excessive maintenance and a loss of the shearing wire.

An experiment has been carried out in which motion is supplied directly to both the blade-bearing drums.

This experiment also provides that the drums are supported at the respective ends by cams.

The cams of one drum cooperate with the cams of the other drum so as to define the shearing moment on each occasion.

Synchronisation is achieved by means of toothings located at the end of the drums and outside the cams.

When the cams are made to rotate so as to take the blades into the shearing position, the toothings cooperate with each other correctly.

When the cams are made to rotate so as to take the blades into the non-shearing position, while they continue to rotate around their axis, the toothings are distanced and remain connected only through the tips of the teeth and not along the primitive circumference.

The resulting connection is therefore extremely precarious.

A command organ, acting on a pair of cams connected to a drum, drives both the pairs of cams so as to provide, on each occasion, the shearing position.

It is quite evident that this solution known to the state of the art entails discontinuous efforts, uncertain synchronisation, two drive inlets, vibrations, etc.

The present applicant has designed, tested and embodied this invention to overcome the shortcomings of the state of the art and to obtain further advantages.

SUMMARY OF THE INVENTION

According to the invention two blade-bearing drums with parallel axes are provided, as in the state of the art.

Both the drums, at their two ends, have seatings for bearings, associated with an eccentric tube; the axis of rotation of the drums is eccentric by a desired value with respect to the axis of periodical rotation of the eccentric tube.

The eccentric tubes have toothings on the circumference and outside which are always engaged two by two.

All this is known to the state of the art.

According to the invention, the shears has only one drum supplied with motion.

At one end, advantageously at the end opposite the end where motion is supplied, the two drums have a gear or toothing.

According to a variant, the toothing can be included on the side where motion is supplied.

As the axis of the drum rotates around the axis of the eccentric tube due to the effect of the eccentricity of the latter, the toothing is displaced according to an arc of a circle.

As the drum oscillates through the arc of the circle, caused by the eccentric tube, the toothing is always engaged with the inner toothing included in a coordinated rotary tube which in turn has an outer toothing.

The outer toothings of the two rotary tubes are always engaged.

The rotary tubes have an axis of rotation corresponding to the axis of rotation of the cam, so that the cams rotate around the same axis around which the rotary tube is continuously rotating due to the action of the toothing or gear which is solid with each respective drum.

As a consequence, the gear on the respective drum is always correctly engaged with the inner toothing of the respective rotary tube, also when the drums swing in order to carry out the shearing operation.

BRIEF DESCRIPTION OF THE DRAWINGS

These and other characteristics of the invention will become clear from the following description of a preferred embodiment, given as a non-restrictive example and with the assistance of the attached drawing, which shows a longitudinal section, along a vertical plane, of a shears according to the invention.

DETAILED DESCRIPTION OF A PREFERRED EMBODIMENT

With reference to the attached drawing, a shears 10 according to the invention comprises a frame 17 with two transverse sides 18a and 18b.

The shears 10 also comprises two shearing drums 11 and 111, arranged parallel to each other and each bearing longitudinally a corresponding shearing blade 30, 130.

The drums 11 and 111 are both able to counter-rotate on their own axis of rotation 24, 124, so that with every rotation through 360° the blades 30 and 130 are in their shearing position as shown in the drawing.

According to one characteristic of the invention, a single outer motor organ, which is not shown here, gives the rotation command to the drums 11 and 111 and is connected in a conventional manner to the end 12 of the drum 11 alone. Thus the drum 111 is driven.

The drums 11 and 111 are assembled on bearings 27a, 27b and respectively 127a, 127b housed inside corresponding cylindrical seatings 22a, 22b, respectively 122a, 122b of two pairs of eccentric tubes 13a, 13b and 113a, 113b.

The pair of eccentric tubes 13a, 13b is assembled to rotate on bearings 28a, 28b, while the pair of eccentric tubes 113a, 113b is assembled to rotate on bearings 128a, 128b.

The eccentric tubes 13a, 13b are suitable to rotate on their own common axis 23, parallel to the rotation shaft 24 and eccentric to the shaft 24 by a value "e". In a similar and specular manner, the eccentric tubes 113a, 113b are suitable to rotate on their own common axis 123, parallel to the rotation shaft 124 and eccentric to the shaft 124 by the same value "e".

Each eccentric tube 13a, 13b, 113a, 113b has a toothed wheel 14, respectively 114 on the outside. To be more exact, the toothed wheel 14a of the tube 13a engages with the corresponding toothed wheel 114a of the tube 113a and the toothed wheel 14b of the tube 13b engages with the corresponding toothed wheel 114b of the tube 113b.

The toothed wheels 114a and 114b in turn also engage with two pinions 15a and respectively 15b keyed onto a single shearing command shaft 16, assembled to rotate on bearings 31 housed in cylindrical seatings of the sides 18a and 18b.

The shearing command shaft 16 is made to rotate in a conventional manner by a motor which is not shown in the drawing, so to make the pairs of eccentric tubes 13a, 13b and 113a, 113b rotate in opposite directions to each other, and thus achieve a cyclical movement of bringing together and drawing apart the drums 11 and 111 and, consequently, the shearing blades 30 and 130.

The shears 10 also comprises a synchronisation device 32, associated with the drums 11 and 111, which in this case is arranged at the opposite end to the drive inlet 12. To be more exact, each drum 11, 111 has a shaft 19, 119 bearing an outer gear 20, respectively 120 which engages with a corresponding inner gear 26, 126 of a rotary tube 21, 121 so that the latter are always in rotation.

The rotary tube 21 rotates on the same axis of rotation 23 as the eccentric tubes 13a and 13b, while the rotary tube 121 rotates on the same axis of rotation 123 as the eccentric tubes 113a and 113b. This ensures there is a perfect coupling of the inner toothed wheels 26, 126 and the respective outer toothed wheels 20, 120 for any relative position whatsoever of the drums 11 and 111.

Each rotary tube 21 and 121 has an outer toothing or gear 25, 125. The toothings 25 and 125 are always engaged with each other and achieve the synchronisation of the two drums 11 and 111. A device 35 to adjust the gap between the blades 30 and 130, of a conventional type, is associated with the tube 21.

The gears 20, 120 and 25, 125 include means to compensate the play between their meshed teeth, means which comprise crown wheels 33, 133 and 134, coupled with the shafts 19, 119 respectively with the tube 121, in a manner which is angularly staggered with respect to the corresponding gears 20, 120 and respectively 125.

What is claimed is:

1. Continuously rotating shears to shear to size metallic strip fed continuously at up to around 20 meters per second and having a thickness of from 0.5 mm to 5 mm and a width of from 500 mm up to at least 1500 mm, comprising:
    a frame;
    first rotary cam means rotatably mounted on said frame;
    second rotary cam means rotatably mounted on said frame, said first and second rotary cam means being provided with corresponding toothed wheels in engagement therebetween for causing said first and second rotary cam means to rotate in opposite angular directions;
    a first blade-bearing drum carrying a corresponding first shearing blade, said first blade-bearing drum being rotatably mounted on said first rotary cam means;
    a second blade-bearing drum carrying a corresponding second shearing blade, said second blade-bearing drum being rotatably mounted on said second rotary cam means;
    synchronization means for synchronizing the rotation of said two blade-bearing drums, said synchronization means comprising a first rotary tube and a second rotary tube rotatably mounted on said frame, said rotary tubes having the same rotational axes of said rotary cam means, said first rotary tube having a first outer gear and a first inner gear, said second rotary tube having a second outer gear and a second inner gear, said first and second outer gears being in engagement therebetween for causing said first and second rotary tubes to rotate in opposite angular directions, said first blade-bearing drum having a first external gear in engagement with said first inner gear and said second blade-bearing drum having a second external gear in engagement with said second inner gear, whereby said first and second blade-bearing drums are caused to rotate in opposite angular directions;
    an external source of motion connected to at least one of said blade-bearing drums for causing the rotation thereof; and
    shearing command means connected to at least one of said cam means for causing the rotation thereof.

2. Shears as in claim 1, wherein said rotary tubes rotate on the same axis of rotation as said rotary cam means, thereby ensuring a perfect coupling between said first and second inner gears and the respective first and second external gears for any relative position whatsoever of said blade-bearing drums.

3. Shears as in claim 1, wherein said external source of motion is connected to one of said blade-bearing drums only.

4. Shears as in claim 1, wherein each one of first and second external gears is located outside said frame.

5. Shears as in claim 1, wherein said first and second external gears are located on the opposite side of said frame with respect to said external source of motion.

6. Shears as in claim 1, wherein said first and second external gears and said external source of motion are located on the same side of said frame.

7. Continuously rotating shears to shear to size metallic strip fed continuously, comprising:
    a frame having transverse sides;
    a first blade-bearing drum carrying a corresponding first shearing blade;
    a second blade-bearing drum carrying a corresponding second shearing blade;
    a first pair of eccentric tubes rotatably mounted on each side of said frame, said first blade-bearing drum being rotatably mounted on said first pair of eccentric tubes, an axis of rotation of said first blade-bearing drum being parallel and eccentric to an axis of rotation of said first pair of eccentric tubes;
    a second pair of eccentric tubes rotatably mounted on each side of said frame, said second blade-bearing drum being rotatably mounted on said second pair of eccentric tubes, an axis of rotation of said second blade-bearing drum being parallel and eccentric to an axis of rotation of said second pair of eccentric tubes, each of said first and second pairs of eccentric tubes being provided with corresponding toothed wheels in engagement therebetween for causing said first and second pairs of eccentric tubes to rotate in opposite angular directions;

a first rotary tube rotatably mounted on said frame, said first rotary tube having the same rotational axis as said first pair of eccentric tubes, said first rotary tube having a first outer gear and a first inner gear;

a second rotary tube rotatably mounted on said frame, said second rotary tube having the same rotational axis as said second pair of eccentric tubes, said second rotary tube having a second outer gear and a second inner gear, said first and second outer gears of said first and second rotary tubes, respectively, being in engagement therebetween for causing said first and second rotary tubes to rotate in opposite angular directions, said first blade-bearing drum having a first external gear in engagement with said first inner gear of said first rotary tube and said second blade-bearing drum having a second external gear in engagement with said second inner gear of said second rotary tube, whereby said first and second blade-bearing drums are caused to rotate in opposite angular directions;

an external source of motion connected to at least one of said first and second blade-bearing drums for causing the rotation thereof; and shearing command unit connected to at least one of said first and second eccentric tubes for causing the rotation thereof.

8. Shears as in claim 7, wherein said external source of motion is connected to one of said first and second blade-bearing drums only.

9. Shears as in claim 7, wherein each one of first and second external gears is located outside said frame.

10. Shears as in claim 7, wherein said first and second external gears are located on the opposite side of said frame with respect to said external source of motion.

11. Shears as in claim 7, wherein said first and second external gears and said external source of motion are located on the same side of said frame.

* * * * *